(12) United States Patent
Sahli et al.

(10) Patent No.: US 6,347,581 B2
(45) Date of Patent: Feb. 19, 2002

(54) PERFECT PEELER PLUS TABLE

(76) Inventors: Janet M. Sahli; Michael J. Sahli, both of 25 Birch Ave. N., P.O. Box 812, Maple Lake, MN (US) 55358

( * ) Notice: Subject to any disclaimer, the term of this patent is extended or adjusted under 35 U.S.C. 154(b) by 0 days.

(21) Appl. No.: 09/904,406

(22) Filed: Jul. 12, 2001

Related U.S. Application Data

(60) Provisional application No. 60/218,011, filed on Jul. 12, 2000.

(51) Int. Cl.⁷ .............................. A23N 7/00; A47J 17/00; A47J 17/04; A47J 43/28
(52) U.S. Cl. ............................ 99/542; 99/584; 99/589; 99/593; 99/595; 99/598; 99/599; 108/26
(58) Field of Search .......................... 99/584, 538–545, 99/588–599, 635, 636, 643; 108/26, 50.11, 132, 161, 34, 29, 90; 312/243, 246, 211, 280, 201, 235.2, 31.1

(56) References Cited

U.S. PATENT DOCUMENTS

| | | |
|---|---|---|
| 9,347 A | 2/1836 | Hatcher |
| 1,568,154 A | 1/1926 | Hannon et al. |
| 1,579,823 A | 4/1926 | Langguth |
| 1,872,732 A | 8/1932 | Goranson et al. |
| 1,950,791 A | 3/1934 | Goranson et al. |
| 2,089,502 A | 8/1937 | Polk |
| 2,683,639 A | 7/1954 | Brenny |
| 3,583,457 A * | 6/1971 | Vadas ........................ 99/584 X |
| 4,041,964 A | 8/1977 | Shamoon |
| 4,157,681 A * | 6/1979 | Akesson et al. .......... 99/541 X |
| 4,441,413 A | 4/1984 | Mori |
| 4,606,263 A * | 8/1986 | Ross et al. ..................... 99/542 |
| 4,653,393 A * | 3/1987 | Ross ............................ 99/542 |
| 4,747,352 A | 5/1988 | Guidry et al. |
| 4,895,069 A * | 1/1990 | Kristensen ................... 99/574 |
| 5,097,758 A | 3/1992 | Fresh |
| 5,158,011 A * | 10/1992 | Chen ........................... 99/584 |
| 5,558,011 A | 9/1996 | Heim |
| 5,778,800 A | 7/1998 | Liang |
| 5,806,414 A * | 9/1998 | Heinzen et al. ................ 99/591 |
| 5,950,528 A | 9/1999 | Wang |
| 6,053,098 A | 4/2000 | Yamamoto |
| 6,082,253 A | 7/2000 | Ridler |
| 6,253,670 B1 * | 7/2001 | Gingras ........................ 99/589 |

* cited by examiner

Primary Examiner—Timothy F. Simone
(74) Attorney, Agent, or Firm—Albert W. Watkins

(57) ABSTRACT

A folding table having a hole in the table top is combined with a fruit and vegetable peeler. The table may include a plastic bag retained within and under the hole for containing peelings therein, or may include a variety of other containers in alternative embodiments. In one such alternative embodiment, the table and peeler are combined with a sink and garbage disposal, whereby the peelings may pass freely through the table and ultimately through the garbage disposal. The table is preferably constructed of materials and components that are easily cleaned, offer stain resistance, and which may be compactly stored.

19 Claims, 3 Drawing Sheets

PERFECT PEELER PLUS TABLE

This application claims priority to U.S. Provisional Application serial No. 60/218,011 filed Jul. 12, 2000, the contents which are incorporated herein by reference.

BACKGROUND OF THE INVENTION

1. Field of the Invention

This invention pertains generally to food and beverage apparatus, and more specifically to a table-supported portable produce peeler in combination with a folding table having a peel receptacle therein.

2. Description of the Related Art

Various vegetables and fruit are more palatable and/or safer to consume when an external peel has been removed. To remove the peel, various peelers have been proposed. Several more comprehensive peeling machines have been proposed, such as U.S. Pat. No. 1,872,732 by Goranson et al and U.S. Pat. No. 2,089,502 by Polk. These machines include devices to support fruit, a peeling separator, and a receptacle or receiver for the peels. However, these are massive machines which are designed for stationary commercial applications, and are only feasible where the volumes of produce to be peeled are great. Such peelers are too bulky to be used within a home by an individual or family and stored out of the way when not in use. Furthermore, these machines are sufficiently complex to be quite expensive to purchase and difficult to maintain.

In order to be useful within a household, a produce peeler needs to be simple to use, require little if any maintenance, and require minimal space to use and store. An early example of a peeler machine more suitable for households is U.S. Pat. No. 9,347X to Hatcher. In the Hatcher patent, a mechanized peeler is mounted upon a small table or bench. The number of moving parts is limited to three rotary axles, and simple gearing components. This design is relatively simple to use and maintain, and of more reasonable cost than a commercial machine. Unfortunately, the Hatcher patent still requires substantial space for use and storage, and would consume most of a counter top or storage cabinet within a typical kitchen. Consequently, the Hatcher construction has not found wide-spread use in modem kitchens, which are designed for multipurpose uses with many diverse appliances, and which consequently do not have adequate space for even this large a machine.

More recent peelers have been designed that are provided with a clamp which enables Ad attachment to a table, counter top or other work surface. Exemplary of this type of peeler is U.S. Pat. No. 5,950,528 to Wang, the contents which are incorporated herein by reference for the enablement of the construction thereof This type of peeler is typically relatively flat, enabling the peeler to fit within a small kitchen drawer when not in use. When needed, the peeler may be removed from the drawer, clamped to the work surface such as a table or counter top, and immediately used. In the Wang construction, there are only two rotary shafts, and only one gear pair. In view of the few parts, the cost of the peeler is much more reasonable for a homeowner, and there is no necessary maintenance required other than cleaning the peeler after each use. For these reasons, this type of peeler has gained wide-spread acceptance, and is in use in many households.

Unfortunately, there is nothing provided with the Wang type of peeler to collect peels, nor is there a way to retain liquids such as juices that may be released during peeling. Consequently, when this type of peeler is being used, it must either be mounted to overhang beyond the work surface, such that peelings may be caught in a pail on the floor beneath, or the peelings and juice must be cleaned away from the work surface periodically during use. When a pail is used, there is the added risk that the pail will either not catch everything released from the peeler, consequently leaving the floor or work surface soiled, or that the pail will be accidentally kicked or bumped and spilled. Furthermore, the peeler may undesirably damage the work surface through adverse mechanical interaction with the peeler as the crank is being turned to spin the fruit, during clamping, or through chemical interaction from the peels and juice.

In spite of the many advantages of the clamp-type peelers, the disadvantages are still substantial enough that many persons continue to use an even simpler hand-held produce peeler. This hand-held peeler typically consists of a handle, and a cutter formed from a strip of metal with a slot having sharpened edges forming internal blades. The benefits of this type of peeler are even By more compact storage, the ability to use the peeler adjacent a sink or other readily cleaned work area or surface, and ease of cleaning the peeler. What is desired then is a way to capture the benefits of the clamp-type household peeler together with as many beneficial features of the hand-held peeler as possible.

SUMMARY OF THE INVENTION

Exemplary embodiments of the present invention solve the inadequacies of prior peeling machines and tools by providing, in a first manifestation, a machine for removing exterior layers from produce. The machine is simultaneously capable of preserving both space and cleanliness within a food preparation area by having a minimum number of parts which require no maintenance other than cleaning after each use. Consequently, the machine is compact when stored and of relatively low cost. It is further readily removed from storage, assembled, and then immediately used, and is sufficiently portable and compact to be used upon a work area within said food preparation area, including within a basin or sink. When used with a basin or sink, any mess is contained and subsequent clean-up is simplified. The machine has a peeler having a fastener fastenable to a support and removable therefrom for storage, a produce holder, and a means co-operative with the produce holder for separating exterior layers from the produce. A folding support has a generally planar top support. Means are provided for supporting the peeler above the top surface. A stand is pivotally attached to the support top surface which enables the stand to pivot between parallel with the support top surface and normal thereto. Finally, a passage through the top surface is aligned with the peeler to permit the exterior layers or peelings to pass through the top surface.

In a second manifestation, the invention is an apparatus for peeling an exterior peel from fruits and vegetables. A generally planar, horizontally extending table top is provided. A clamp is fastenable to the table top and removable therefrom for storage. A holder for said fruits and vegetables is attached to the clamp and retained above the table top when in operative position. A separator is co-operative with the holder for removing exterior peel from fruits and vegetables. As the peel is removed, a hole centrally located within and extending entirely through the table top permits the peel to pass through gravitationally. At least two vertically extending legs space the table top vertically above a subsurface, and hinges attached to the legs and table top permit relative movement therebetween, wherein the legs may be laid co-planar with table top for storage.

Additional manifestations of the invention further include various receptacles for retaining peelings, as well as further combinations with sinks or wash basins, and also with garbage disposals.

OBJECTS OF THE INVENTION

A first object of the invention is the provision of a machine that supports fruit, vegetables and other produce, and includes a peeling separator and a receptacle or receiver for the peels. A second object is the provision of such a machine while also preserving an associated working area within the kitchen, most preferably by enabling the machine to fit within a small kitchen drawer when not in use. A third object of the invention is to enable the machine to be readily removed from storage, assembled readily, and then immediately used. Another object of the invention is to ensure that the machine has a minimum number of parts, thereby keeping the cost of the peeler reasonable for household use and requiring no necessary maintenance other than cleaning the machine after each use. A further object of the invention is to provide a means to retain or collect stray peels or juice that do not pass directly into the peel receptacle. Yet another object of the invention is to prevent adverse mechanical or chemical interaction with surrounding work areas prior to or during use of the machine. Still another object of the inventions to enable the machine to be used adjacent a sink or other readily cleaned work area or surface, thereby assisting with containment of any mess and speeding subsequent clean-up thereof. Yet a fixer object of the invention is to enable the operator to combine the features of the machine with an in-sink garbage disposal, further facilitating rapid clean-up after use.

BRIEF DESCRIPTION OF THE DRAWINGS

Other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
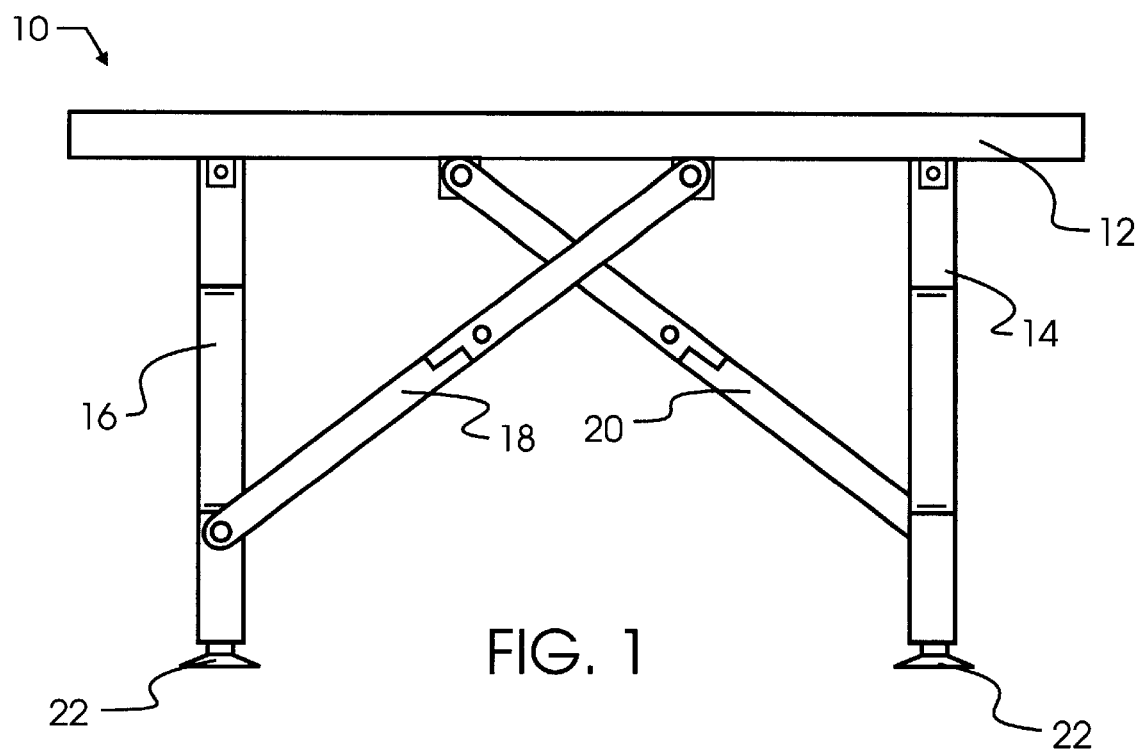
FIG. 1 illustrates a preferred embodiment table for use in association with the inventive peeler apparatus from a side plan view.
Figure 2:
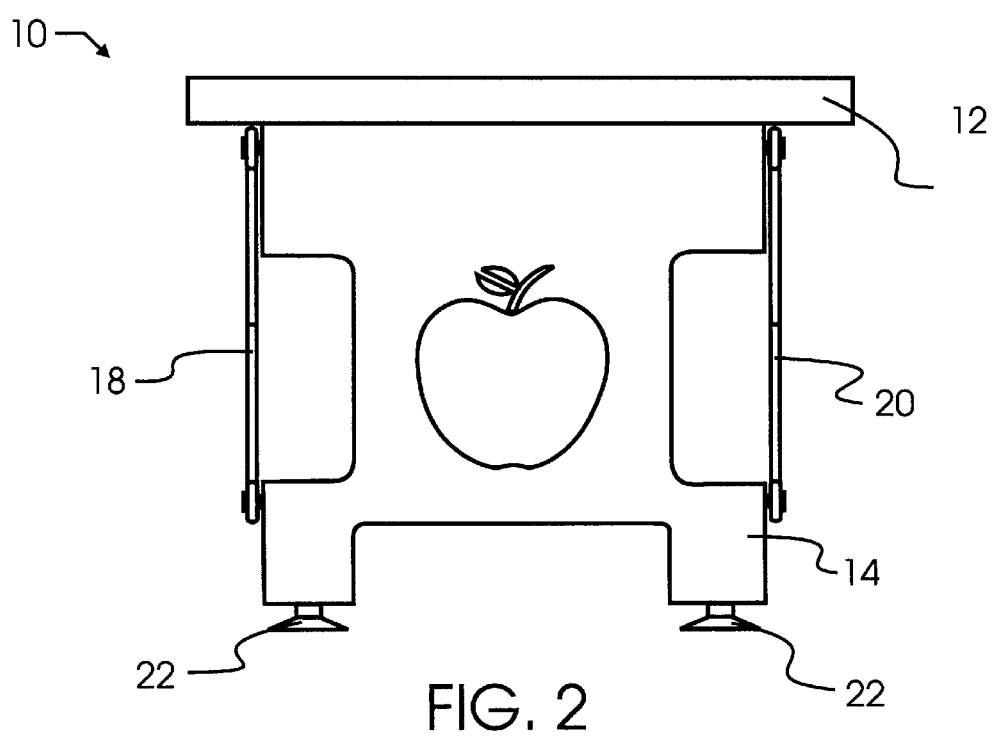
FIG. 2 illustrates the preferred embodiment table of FIG. 1 from a right side end plan view.

The present invention provides an improved peeling machine which combines the significant advantages of each type of prior art peeler into a single device. With preferred embodiment peeling machine 100, limitations of the prior art peelers are substantially overcome and benefits maintained.

As may be seen from the figures, table 10 includes a generally planar and horizontal top 12, vertically extending legs 14 and 16 that are most preferably pivotally attached thereto through small Lapins, hinges or the like as is known in the art. In contemplated alternatives, the legs may be removable locking legs rather than pivoting, or may be fixed. However, the use of folding legs simplifies assembly and storage and so is most preferred. In a yet further alternative, a single leg or spacer may be provided, assuming that the base of such a leg were sufficiently large or somehow anchored to a subsurface.

Additional support is provided to legs 14, 16 through diagonally extending brackets 18, 20. Most preferably, a set of rubber or pliant plastic suction cups 22 are provided at the bottoms of legs 14, 16 to allow table 10 to be securely anchored to a variety of diverse surfaces, including tables, counters, sinks and any other suitable surface. While suction cups 22 are most preferred, other types of feet may be provided, including various rubber or other non-slip attachments, or more permanent fixtures into which the most preferred table may nest or engage. Suction cups 22 additionally provide compliance and cushioning to prevent table 10 from damaging any subsurface upon which table 10 may be placed.

Within the center of table top 12 there is an opening 42 that, during use, may be provided with a bag 50 and retaining ring 40. Ring 40 is most preferably a plastic ring of relatively small cross-section that is inserted within opening 42 and which is approximately equal to or even slightly larger than opening 42, to form a gentle compression fit with the table top 12, and to thereby retain bag 50. Other alternatives would include various pails, bowls or other receptacles in place of bag 50. These alternative receptacles may be adhered to table top 12, or may be spaced therefrom as would be apparent to those skilled in the art. In one contemplated embodiment illustrated in FIG. 4, bag 50 maybe removed and peelings maybe allowed to pass through without capture. The benefit of this configuration will be described herein below.

Figure 3:
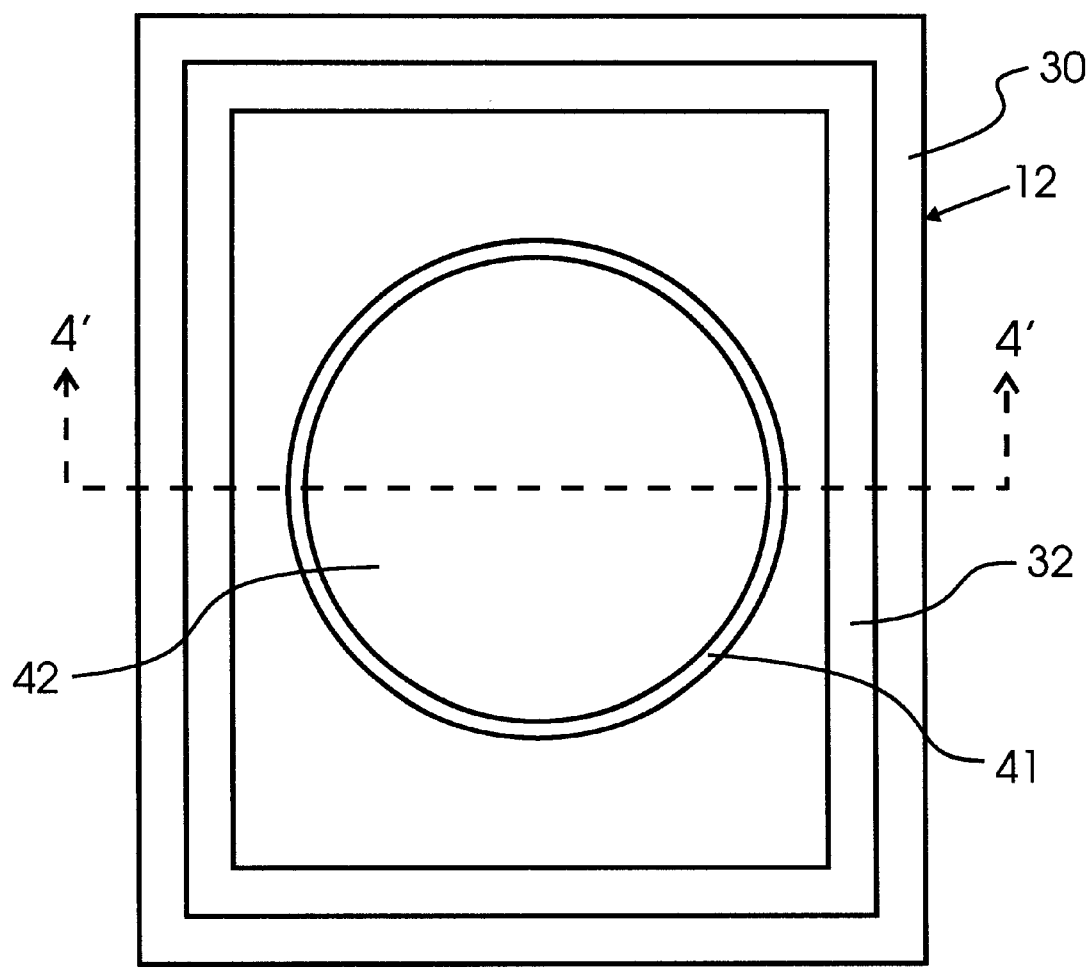
FIG. 3 illustrates the preferred embodiment table of FIG. 1
Figure 4:
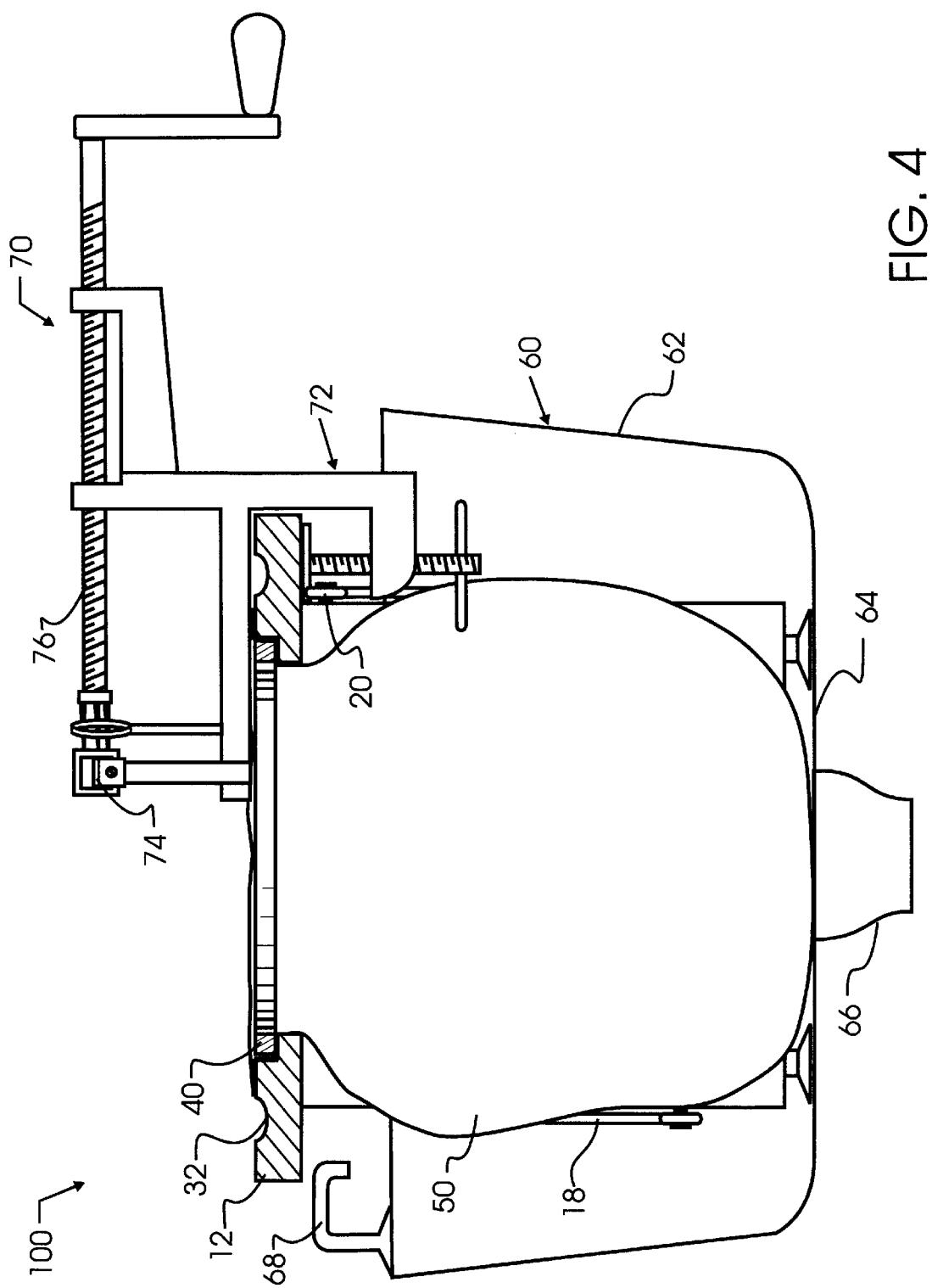
FIG. 4 illustrates the preferred embodiment of the invention showing the preferred embodiment table of FIG. 1 from a cross-sectional view taken along line 2' of FIG. 3 and further including a clamp-type peeler and wash basin.

Visible in FIGS. 3 and 4 is most preferably a trough 32 which borders the outside perimeter of the top surface 30 of table top 12, for collecting any liquids that might otherwise accumulate. This trough 32 may, in one embodiment, be connected to opening 42 to drain directly therein. Alternatively, trough 32 may simply form a reservoir for liquids.

Table top 12 is most preferably manufactured from polypropylene, since polypropylene is stain and chemical resistant, is readily available as a food grade stock material, and is readily worked for manufacturing purposes. Nevertheless, other materials having these characteristics may also be used, including various metals, plastics and wood.

FIG. 4 illustrates from cross-section the full assembly of the preferred embodiment of the invention, including table 10, receptacle 50, sink or wash basin 60 having side walls 62 and base 64, garbage disposal 66, water faucet 68, and peeler 70. Peeler 70 will most preferably be of the Wang type discussed herein above, and may include clamp 72, peel removing blade 74 and fruit holder 76 as is known. As noted herein above, in this embodiment receptacle 50 may be removed completely, allowing peelings to drop to the bottom of basin 60. When peeling is complete, all peels may simply be washed down through garbage disposal 66 for disposal. Using this configuration, clean-up will be greatly simplified, and basin walls 62 will aid in the capture of errant droplets or peelings.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A machine for removing exterior layers from produce that is simultaneously capable of preserving both space and cleanliness within a food preparation area by having a minimum number of parts which require no maintenance other than cleaning after each use, thereby enabling the machine to be compact when stored and of relatively low cost, and which is readily removed from storage, assembled, and then immediately used, and which is sufficiently portable and compact to be used upon a work area within said food preparation area, including within a basin or sink, thereby assisting with containment of any mess and speeding subsequent clean-up thereof, comprising in combination:

a peeler having a fastener fastenable to a support and removable therefrom for storage, a produce holder, and a means co-operative with said produce holder for separating said exterior layers from said produce; and a folding support having a generally planar top support, a means for removably supporting said separating means above said generally planar support top surface, a stand, a pivotal attachment between said support top surface and said stand which enables said stand to pivot between a plane generally parallel with said support top surface and a plane generally normal thereto, and a passage through said top surface aligned with said peeler to pass said exterior layers through said top surface when said exterior layers are separated by said separating means.

2. The combination of claim 1 further comprising a receptacle for said exterior layers adjacent said passage and generally below said support top surface.

3. The combination of claim 2 further comprising a means for retaining said receptacle to said passage.

4. The combination of claim 3 wherein said receptacle further comprises a flaccid bag.

5. The combination of claim 4 wherein said retaining means further comprises a resilient band.

6. The combination of claim 5 wherein said passage further comprises a top opening diameter adjacent said peeler greater than a bottom opening diameter adjacent said receptacle.

7. The combination of claim 6 wherein said resilient band presses within said top opening diameter without passing through said bottom opening diameter.

8. The combination of claim 1 wherein said folding support further comprises resilient feet attached to said stand distal to said pivotal attachment for supporting said stand upon said work area.

9. The combination of claim 8 wherein said resilient feet further comprise suction cups.

10. The combination of claim 1 further comprising a means to retain or collect stray peels or juice that do not pass directly into the peel receptacle.

11. The combination of claim 1 further comprising a basin having a water source and drain, said folding support stand positioned within said basin.

12. The combination of claim 1 further comprising a garbage disposal in combination with said basin drain, for comminuting said exterior layers passing through said drain.

13. An apparatus for peeling an exterior peel from fruits and vegetables, comprising:

a generally planar, horizontally extending table top;

a clamp fastenable to said table top in an operative position and removable therefrom for storage;

a holder for said fruits and vegetables attached to said clamp and retained above said table top when in said operative position;

a separator co-operative with said holder for removing said exterior peel from said fruits and vegetables;

a hole centrally located within and extending entirely through said table top having a diameter sufficiently large to permit said exterior peel to pass through gravitationally after said removal; and a spacer spacing said table top vertically above a subsurface.

14. The apparatus of claim 13 further comprising a basin having a generally horizontal bottom forming said subsurface, vertically extending side walls, and source of flowing water and a drain therefrom.

15. The apparatus of claim 14 further comprising a garbage disposal within said drain for comminuting solids passing through said drain.

16. The apparatus of claim 13 further comprising a receptacle attached to a bottom surface of said table top and removably adhered thereto.

17. The apparatus of claim 13 further comprising a groove circumferentially positioned adjacent the horizontal extremes of said table top for collecting and retaining liquids that accumulate upon said table top during operation.

18. The apparatus of claim 13 wherein said spacer further comprises at least two vertically extending legs.

19. The apparatus of claim 18 further comprising hinges attached to said at least two vertically extending legs and said table top, said hinges operative to permit relative movement there between, wherein said legs may be laid co-planar with said table top for storage.

* * * * *